United States Patent

[11] 3,602,008

[72] Inventor Zar W. Kelley
8438 Broadview Road, Cleveland, Ohio 44141
[21] Appl. No. 880,874
[22] Filed Nov. 28, 1969
[45] Patented Aug. 31, 1971

[54] DRINKING GLASS FROSTER
3 Claims, 6 Drawing Figs.
[52] U.S. Cl...................................................... 62/373, 62/293, 251/156
[51] Int. Cl....................................................... F25d 17/00
[50] Field of Search........................................... 62/62, 64, 373, 293; 251/156

[56] References Cited
UNITED STATES PATENTS
2,587,075 2/1952 Tice .............................. 62/62
3,373,580 3/1968 Federighi ..................... 62/64
3,407,624 10/1968 Taylor........................... 62/293

Primary Examiner—Meyer Perlin
Assistant Examiner—Ronald C. Capossela
Attorney—Isler and Ornstein ABSTRACT: A drinking glass froster is provided which enables a glass, such as a cocktail or champagne glass, to be frosted both internally and externally, to thereby retain the glass in its cold condition for longer periods. The froster is of extremely compact construction and design, and is characterized by the fact that it can be quickly and easily assembled and disassembled, with all parts readily accessible for repair or replacement purposes. It is designed especially for use in conjunction with small tanks of liquid carbon dioxide.

PATENTED AUG 31 1971

INVENTOR.
ZAR W. KELLEY

BY
Isler & Ornstein
ATTORNEYS

INVENTOR.
ZAR W. KELLEY
BY
Isler & Ornstein
ATTORNEYS

DRINKING GLASS FROSTER

This invention relates, as indicated, to a froster for frosting drinking glasses, such, for example, as cocktail and champagne glasses.

It has heretofore been proposed, as in the Tice patent 2,587,075, to provide a cocktail glass cooler, in which a source of liquid $CO_2$ under pressure is utilized to deposit a spray of liquid $CO_2$ on the bowl of the glass for frosting thereon and consequent cooling of the glass upon sublimation of the dry ice so formed.

The cooler is so designed that only the inner surface of the bowl is frosted, and moreover, the device is mounted independently of the tank or other source of liquid $CO_2$, so that considerable space is required for installation of the device, and connections of great length are required between the device and the tank. Moreover, the parts of the device are not easily accessible for repair or replacement purposes.

The present invention has, as its primary object, the provision of a device of the character described, through the use of which both the internal and external surfaces of the bowl of the glass may be frosted simultaneously or substantially simultaneously, thereby increasing the period or length of time that the glass is maintained in cold or cooled condition.

Another object of the invention is to provide a device of the character described, which is of extremely simple and compact construction and design, enabling the device to be used in small or limited areas, as, for example, under or on a bar.

A further object of the invention is to provide a device of the character described, which consists of parts which can be quickly and easily assembled and disassembled, and which are readily accessible for repair or replacement purposes.

A still further object of the invention is to provide a device of the character described, which can be mounted on a conventional small tank of liquid $CO_2$, so as to form, in effect, a unitary part of such tank.

Other objects and advantages of my invention will be apparent during the course of the following description.

In the accompanying drawings forming a part of this specification, and in which like numerals are employed to designate like parts throughout the same, FIG. 1 is a fragmentary elevational view of a device embodying the invention, with portions thereof broken away to show the construction and assembly of the parts of the device, and showing also, the manner of mounting the device on a tank of liquid $CO_2$, as well as the manner in which the device is used to frost a cocktail glass;

Figure 1:
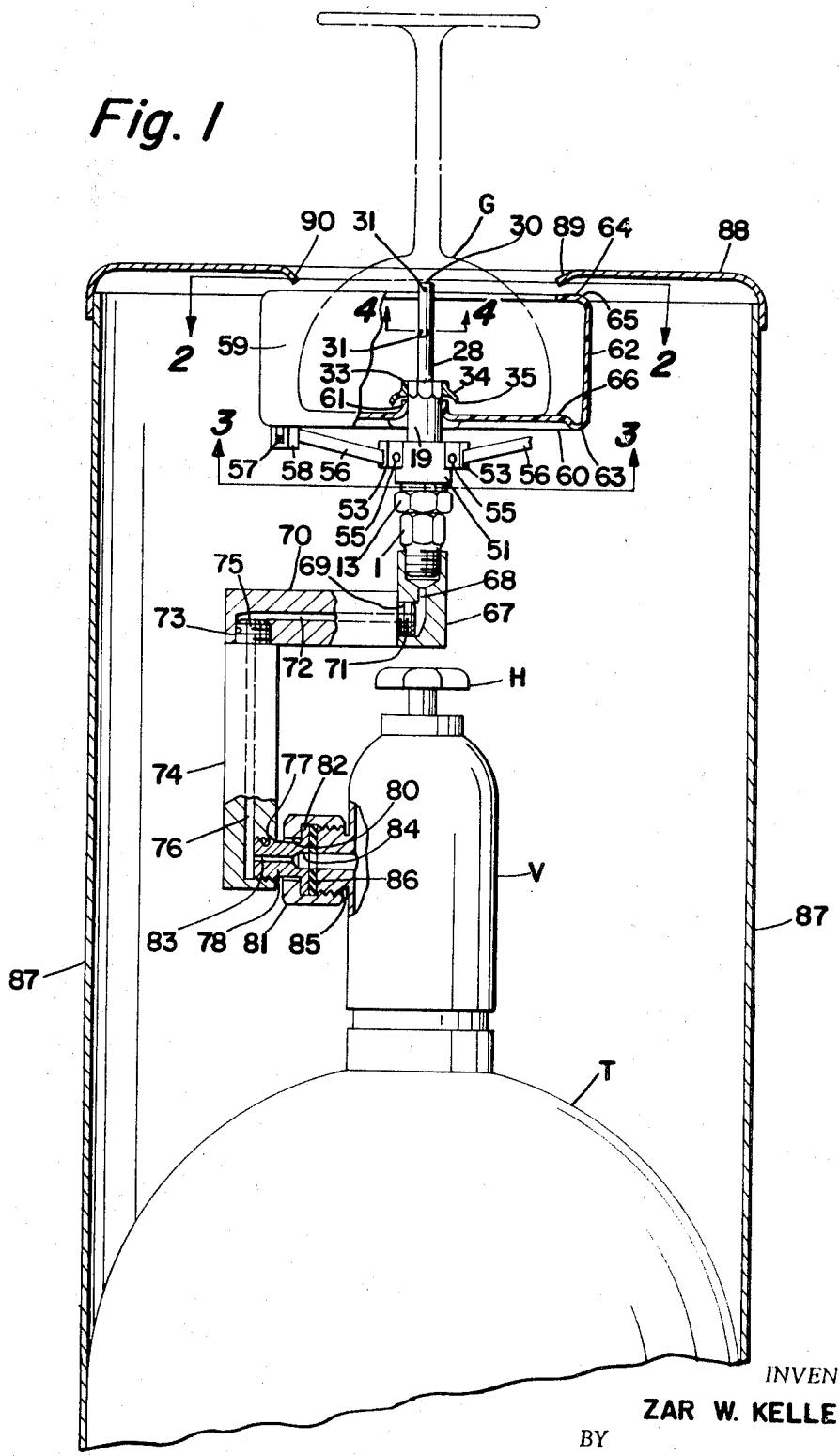
Figure 2:
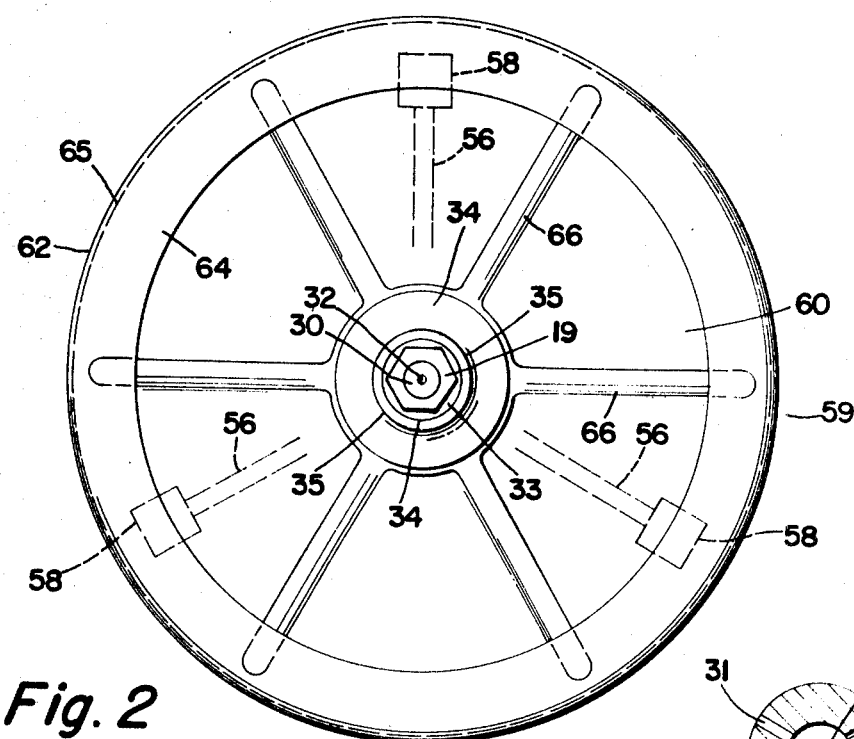
FIG. 2 is a cross-sectional view, on an enlarged scale, taken on the line 2—2 of FIG. 1.
Figure 4:
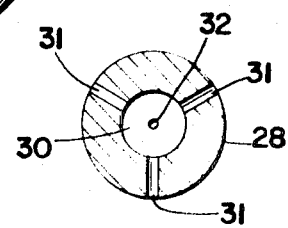
FIG. 4 is a cross-sectional view, on a greatly enlarged scale, taken on the line 4—4 of FIG. 1.
Figure 3:
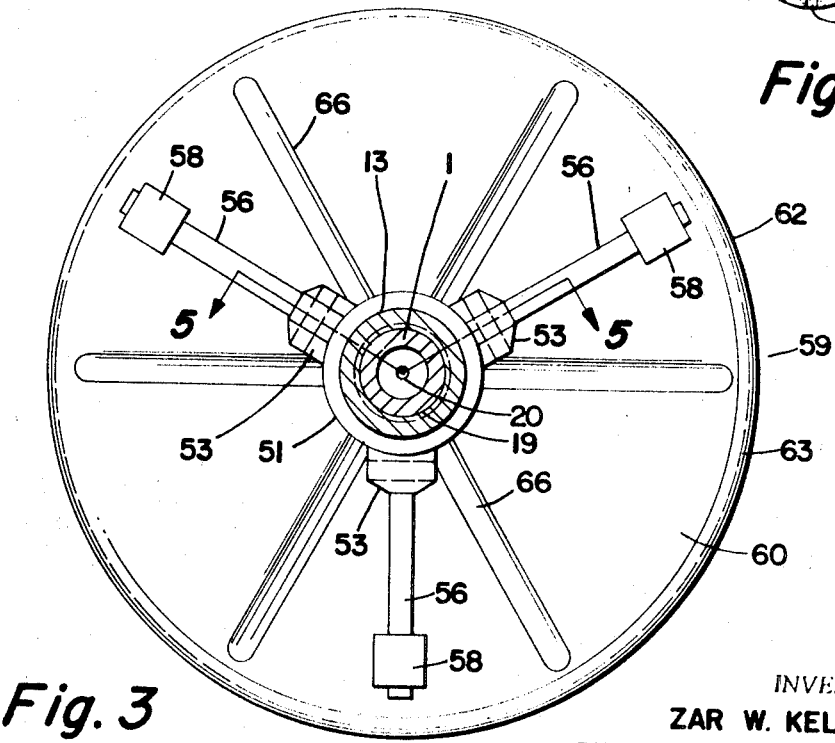
FIG. 3 is a cross-sectional view, also on an enlarged scale, taken on the line 3—3 of FIG. 1.

Referring more particularly to the drawings, the froster will be seen to comprise a valve body 1 of brass stock, having a bore 2 in its upper end, which is counterbored, as at 3, to provide a recess for a purpose to be presently described. The valve body is provided with an annular flange 4 near the lower end of the bore 2, through which a passageway 5 extends, the flange providing with that portion of the bore 2 below the flange 4 a recess, in which an annular valve seat 6 is disposed, the valve seat 6 having a passageway 7 therethrough of the same diameter as the passageway 5. The valve seat 6 is preferably made of Teflon or a similar resin, and extends slightly below the lower end of the bore 2.

Below the bore 2, the valve body 1 is provided with an enlarged bore 8, the lower portion of which is threaded, as at 9.

The valve body is externally threaded at its upper end, as at 10, and is externally threaded at its lower end, as at 11, and a ledge or shoulder 12 is provided below the threads 10, for a purpose to be presently described.

Threadedly secured to the threads 10 of the valve body 1 is a member 13, also made of brass, and having a bore 14 of the same diameter as the bore 2 of the valve body 1. An O-ring 15 is disposed in the recess 3 of the valve body 1, and is clamped in this recess by a shoulder 16 of the member 13, when the latter has been secured to the valve body 1 and into abutment with the ledge or shoulder 12 of the latter. The bore 14 of the member 13 is counterbored, as at 17, to provide a recess for a purpose to be described. The member 13 is also provided with an annular recess 18, which serves a purpose to be presently described.

Mounted for slidable reciprocal movement in the bores 14 and 2 is a nozzle supporting member 19 having an axial passageway 20, which communicates at its lower end with three circumferentially spaced radial passageways or ports 21, which extend through a portion 22 of the nozzle supporting member 19, this portion 22 being of lesser diameter than the portion of the nozzle supporting member which extends through the bore 14.

The nozzle-supporting member 19 is provided with an annular flange 23, which overlies the member 13, and between which and the bottom of the recess 17 of the member 13, a compression coil spring 24 is interposed, this spring normally urging the nozzle supporting member 13 upwardly into abutment with the flange 52.

The axial passageway or bore 20 of the nozzle supporting member 19 is counterbored, at its upper end, as at 25, and this counterbore is, in turn, counterbored, as at 26, to provide a ledge or shoulder 27, which provides a seat for the lower end of a nozzle 28.

The nozzle 28 is threadedly secured to threads 29 of the nozzle supporting member 19.

The nozzle 28 is a tubular element, which is open at the bottom, and is closed at the top, the top of the nozzle being indicated by reference character 30. The wall of the nozzle 28 is provided with two sets of perforations, each set consisting of three circumferentially spaced perforations 31, made with a number 80 drill, and therefore of very small diameter. One set of perforations is disposed near the upper end of the nozzle, and the other set about 3/4 inch from the first set, the perforations of the second set being staggered relatively to those of the first set. The top 30 of the nozzle is also provided with a single perforation 32 located at the axis of the nozzle, and similarly made with a number 80 drill.

The upper end of the nozzle supporting member 19 has an external cross section, which is hexagonal, and has securely fitted thereon an element 33, preferably molded of a plastic material having an external surface 34 of cylindrical form, and an internal surface of hexagonal form corresponding to the hexagonal upper end of the nozzle supporting member 19. The element 33 is provided at its lower end with a downwardly inclined skirt or flange 35, which serves a purpose to be presently described.

Disposed within the bore 8 of the valve body 1 is a valve guide element 36 having a cylindrical bore 37 extending axially therethrough, and having an external surface of hexagonal cross section, the faces of the hexagon coacting with the wall of the bore 8 to provide passageways 38 for the flow of the liquid carbon dioxide, as will be presently described.

The valve guide element 36 is maintained against the lower end of the Teflon insert 6 by a screw 39, which is secured to the threads 9 of the valve body 1, and is provided with an hexagonal socket 40, adapted to be engaged by an Allen wrench, when the screw 39 is to be removed from or inserted into the valve body. The socket 40 communicates with an axial passageway 41 in the screw 39, and this passageway is counterbored, as at 42, to provide a seat or ledge 43, for a purpose to be presently described.

The valve guide element 36 is also provided at its upper and lower end with radial passageways 44, those passageways 44 at the upper end establishing communication between the upper ends of the passageways 38 and the passageways 7 and 5, and those passageways 44 at the lower end establishing communication between the lower ends of the passageways 38 and the counterbore 42.

A valve 45 is provided, which is mounted for slidable movement in the cylindrical bore 37 of the valve guide element 36, and is provided with a stem 46 which extends through the passageways 7 and 5, but is of lesser diameter than these passageways, and terminates in a rounded upper end 47. The valve 45 is normally maintained against the lower end of the portion 22 of the nozzle supporting member 19 by a compression coil spring 48, which is interposed between the bottom 49 of a recess 50 in the lower end of the valve 45 and the seat or ledge 43 of the screw 39. At the juncture between the valve 45 and its stem 46, the valve is provided with an upstanding annular rib 45a, which bears against the lower end of the valve seat 6, and thus closes the valve.

The froster further includes a cylindrical lever support, generally designated by reference numeral 51, which surrounds the upper portion of the member 13 and is provided with an annular flange 52 which surrounds the nozzle supporting member 19 and overlies and rests on the flange 23 of the latter.

The lever support 51 is provided at three circumferentially spaced points with radially extending ears 53, having recesses 54 (see FIG. 5) in the sidewalls of which are mounted pivot pins 55, preferably made of rolled tubular steel.

Mounted for pivotal movement about the pins 55 are levers 56 which extend outwardly and upwardly into recesses 57 of guide elements 58 which are formed integrally with and depend from a table or platform, generally designated by reference numeral 59.

Figures 5, 6:
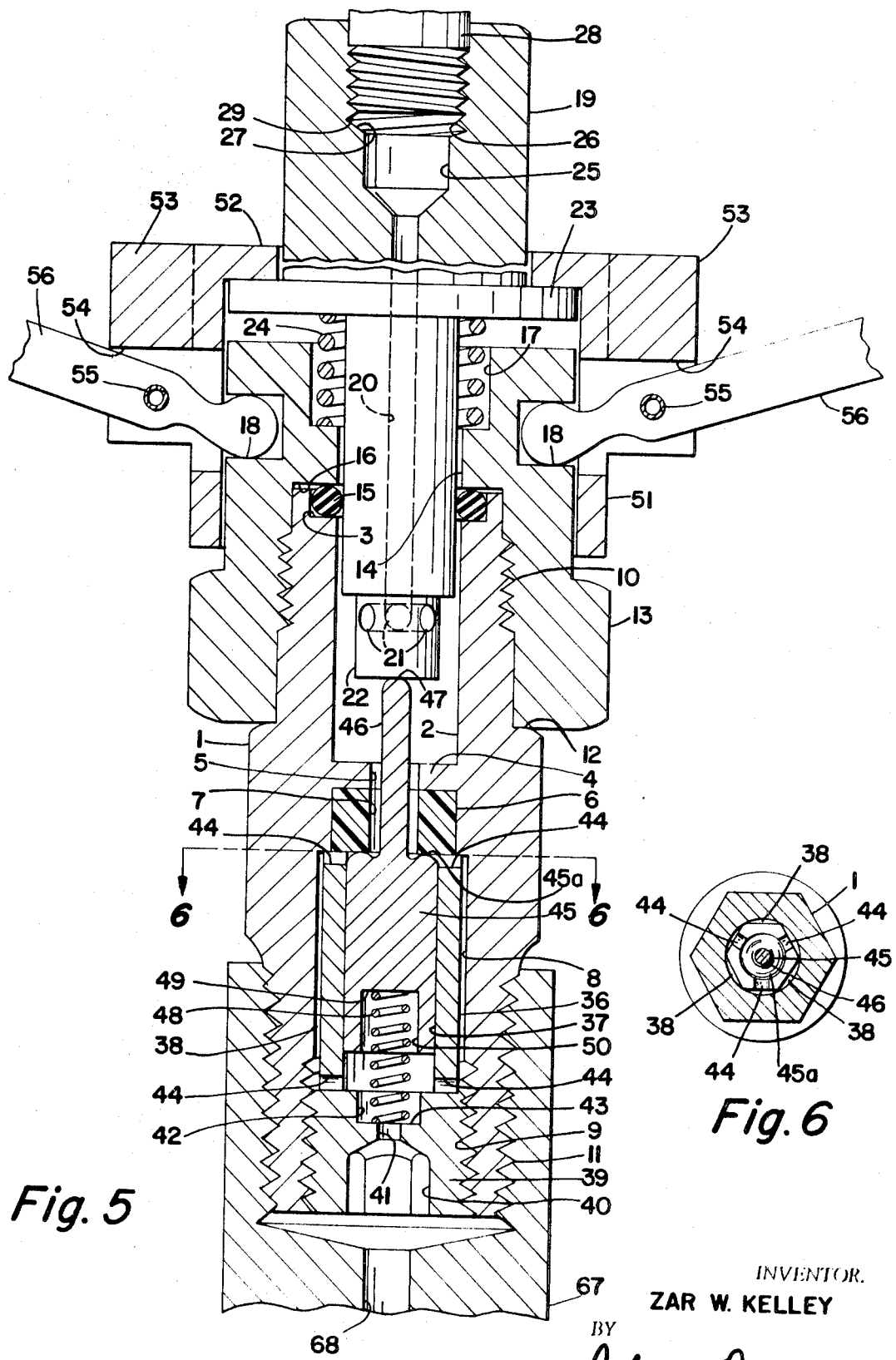
FIG. 5 is a fragmentary cross-sectional view, on a greatly enlarged scale, taken on the line 5—5 of FIG. 3.
FIG. 6 is a cross-sectional view, taken on the line 6—6 of FIG. 5.

The inner ends of the levers 56, as best seen in FIG. 5, extend into the annular recess 18 of the member 13, and are rounded or contoured in such a manner that the upper surface of the recess 18 constitutes a fulcrum for the levers.

The table or platform 59 is preferably molded in a single piece, from a plastic, to provide an annular base portion 60, which rests on the outer ends of levers 56, an upwardly extending curved inner flange 61, which encircles the nozzle support member 13, a cylindrical vertically extending sidewall 62, which is connected to the outer edge of the base portion 60 by an arcuate portion 63, and an inturned annular flange portion 64, which is connected to the upper edge of the sidewall 62 by an arcuate portion 65.

For a purpose to be presently described in connection with the use or operation of the froster, the base portion 60 of the table or platform 59 is provided with six radially extending embossments 66, which provide a support for the rim of an inverted glass, such, for example, as a cocktail or champagne glass G, as shown in FIG. 1, supporting the rim of the glass above or in spaced relation to the upper surface of the base portion 60. Also, as noted in FIG. 1, the flange 61 extends upwardly into the space which is surrounded by the skirt or flange 35 of the element 33.

The froster, as thus described, is adapted to be mounted on a tank T (see FIG. 1), containing liquid carbon dioxide ($CO_2$) under pressure, and is provided at its upper end with a conventional valve V, which may be opened or closed by a control handle H.

For this purpose, the threaded portion 11 of the valve body 1 is threaded into the upper end of a support block 67 (see FIGS. 1 and 5), which has a vertical passageway 68, the lower end of which communicates with a threaded opening 69 in the side of the block 67.

Secured to the block 67, at right angles to the latter, is a second block 70 having a threaded end 71 which is threaded into the opening 69 of the block 67. The block 70 is provided with a passageway 72 which communicates at its outer end with a threaded opening 73 in the bottom of the block 70.

Secured to the block 70 at right angles to the latter, is a third block 74, having a threaded upper end 75 which is threaded into the opening 73 of the block 70. The block 74 is provided with a passageway 76 which communicates at its lower end with a threaded opening 77 in the side of the block 74.

Secured to the block 74 is a coupling 78 having a threaded end 79 which is threaded into the opening 77 of the block 74. The coupling 78 extends through an opening 80 in a nut 81, and is provided with an annular flange 82 which secures the nut 81 to the coupling 78. The coupling 78 has a passageway 83 of relatively small diameter (made with a number 60 drill) extending therethrough, which communicates at one end with a hex socket 84, which is used to receive an Allen wrench, for the purpose of attaching the coupling to the block 74, or removing the coupling from the latter.

The nut 81 is removably attached to the nozzle 85 of the valve V of the tank T, and a gasket 86 is interposed between the nut and the nozzle to provide a leak proof connection.

For the purpose of providing a means of mounting the frosting device on the tank T, while, at the same time, concealing the various parts of the device and the various connections from view, a cylindrical shroud 87 is provided, the lower end of which is clamped by means, not shown, to the wall of the tank T. This shroud extends upwardly to approximately the level of the flange portion 64 of the table or platform 59, and has mounted thereon a cover 88 having a downturned flange 89, which forms an opening 90, of a diameter substantially the same as that of the opening formed by the inner edge of the flange portion 64.

The use or operation of the froster may now be described.

In the use of the device, the valve V may be left open at all times, since the diameter of the passageway 83 in the coupling 78 is so small that the amount of carbon dioxide passing therethrough is insufficient to cause harm to any parts of the device.

When a glass G, such, for example, as a cocktail glass, is to be frosted, it is placed, in inverted position, as shown in FIG. 1, with its rim resting on the embossments or ribs 66 of the base portion 60 of the table or platform 59.

With the glass in such position, a slight downward pressure applied to the glass causes the levers 56 to rock about the pivot pins 55, thereby causing the lever support 51 to be pulled downwardly from the position shown in FIG. 5. This downward movement causes the flange 52 of the support 51 to move the nozzle supporting member 19 downwardly against the force of the compression spring 24, so that the portion 22 of the member 19 pushes the valve 45 downwardly to provide a space between the rib 45a and the valve seat 6.

With the valve 45 thus opened, the liquid carbon dioxide passes from the tank T through the passageway 83 of the coupling 78, the passageways 76, 72 and 68, socket 40, passageways 41 and 42, passageways 44 in the lower end of the valve guide element 36, passageways 38, passageways 44 in the upper end of the guide element 36, the space between the rib 45a and the valve seat 6, the passageways 7 and 5, bore 2, and into the ports 21, passing thence upwardly through passageway 20, through the nozzle 28, and out through the perforations 31 and 32 of the nozzle, into the atmosphere.

On striking the atmosphere, the liquid carbon dioxide is converted into a cold frostlike fog, which condenses on the inner surface of the glass G to form a frostlike coating on such inner surface.

At the same time that the inner surface of the glass is thus coated, a portion of this frostlike fog passes through the channels or passageways between the embossments or ribs 66, outwardly beyond the rim of the glass G and into the space between the outer surface of the glass and the wall 62 of the table or platform 59, condensing on the outer surface of the glass to form a frostlike coating on such outer surface. This condensation on the outer surface of the glass is facilitated or enhanced not only by the proximity of the wall 62 to the outer surface of the glass, but by the provision of the inturned annular flange portion 64 which tends to deflect the carbon dioxide toward the outer surface of the glass and also aids in preventing escape of carbon dioxide into the atmosphere above this flange.

The flange or skirt 35 of the element 33 is effective to prevent moisture from flowing down into the space between the nozzle supporting member 19 and the flange 61 of the table or platform 59 and freezing, which would render the valve inoperative.

When the glass has been frosted, the glass is removed from the table or platform 59, permitting the spring 48 to close the valve 45, and, at the same time, permitting the spring 24 to restore the table or platform 59 to its normal position.

It is thus seen that I have provided a device of the character described which is extremely compact in design, is highly effective for frosting both the inside and outside of a drinking glass, and is characterized by a construction which not only facilitates assembly and disassembly of the parts, but also enables all of the parts to be easily accessible for repair or replacement purposes.

By mounting the device directly on the tank T, long connections between the device and the tank are avoided, and the device becomes, in effect, a unitary part of the tank, or vice versa. The compactness of the device is such as to enable it to be used in small or limited spaces or areas, such, for example, as under or on a bar.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

I claim:

1. In a device of the character described, a platform comprising an annular base provided with a plurality of circumferentially spaced radially extending upstanding embossments formed integrally with said base and adapted for supporting, in inverted position, a glass to be frosted, with the rim of said glass resting on said embossments, and means responsive to a downward pressure on said glass on said platform for spraying liquid carbon dioxide into the space within said glass for frosting the interior surface of said glass, said embossments providing passageways therebetween for conducting carbon dioxide beyond the rim of said glass to the exterior surface of the glass to thereby frost said exterior surface, said means including a lever support disposed beneath said platform, levers pivotally secured to said support, guide elements extending from said base and in which the outer ends of said levers are guided, and means responsive to movement of the inner ends of said levers for permitting the carbon dioxide to enter the space within said glass, said lever support being independent of said base.

2. In a device of the character described, a platform comprising an annular base provided with a plurality of circumferentially spaced radially extending upstanding embossments formed integrally with said base and adapted for supporting, in inverted position, a glass to be frosted, with the rim of said glass resting on said embossments, and means responsive to downward pressure of said glass on said platform for spraying liquid carbon dioxide into the space within said glass for frosting the interior surface of said glass, said embossments providing passageways therebetween for conducting carbon monoxide beyond the rim of said glass to the exterior surface of the glass to thereby frost said exterior surface, said means including a lever support beneath said platform, levers pivotally secured to said support, and means responsive to movement of the inner ends of said levers about the pivotal securement permitting the carbon dioxide to enter the space within said glass, said lever support being independent of said base.

3. In a device of the character described, a platform comprising an annular base provided with a plurality of circumferentially spaced radially extending upstanding embossments formed integrally with said base, and adapted for supporting, in inverted position, a glass to be frosted, with the rim of said glass resting on said embossments, the interior of said glass being of substantial depth, and means responsive to downward pressure of said glass on said platform for spraying liquid carbon dioxide into the space within said glass for frosting the interior surface of said glass, said embossments providing passageways therebetween for conducting carbon dioxide beyond the rim of said glass, said base provided at its periphery with an upstanding cylindrical wall which provides with the outer surface of the glass a space into which the carbon dioxide conducted beyond the rim of the glass enters to provide a frosting for the exterior of said glass, said upstanding cylindrical wall extending upwardly a substantial distance to a level close to the lever of the bottom of the interior of the glass, and an annular flange of substantial width extending radially inwardly from the upper end of said cylindrical wall and adapted to deflect the carbon dioxide within said last named space downwardly towards the exterior of the glass.